(12) United States Patent
Nishio et al.

(10) Patent No.: US 6,180,709 B1
(45) Date of Patent: Jan. 30, 2001

(54) THERMOPLASTIC POLYPROPYLENE COMPOSITION

(75) Inventors: Takeyoshi Nishio, Okazaki; Takayuki Nagai, Toyota; Hisayuki Iwai, Aichi-Ken; Yukihito Zanka, Yokkaichi; Izumi Ishii, Yokkaichi; Hiroki Satoh, Yokkaichi; Yoshihiro Sobajima, Yokkaichi; Mitsuhiro Murayama, Yokkaichi, all of (JP)

(73) Assignees: Japan Polychem Corporation, Tokyo-To; Toyota Jidosha Kabushiki Kaisha, Toyota, both of (JP)

( * ) Notice: Under 35 U.S.C. 154(b), the term of this patent shall be extended for 0 days.

(21) Appl. No.: 09/079,291

(22) Filed: May 15, 1998

(30) Foreign Application Priority Data

| | | |
|---|---|---|
| May 16, 1997 | (JP) | 9-127041 |
| Jul. 4, 1997 | (JP) | 9-179768 |
| Jul. 29, 1997 | (JP) | 9-202833 |

(51) Int. Cl.$^7$ .................................... C08K 3/34
(52) U.S. Cl. .................. 524/451; 524/399; 524/400; 524/99; 524/102; 525/89; 525/98
(58) Field of Search .............. 524/451, 99, 102, 524/399, 400; 525/89, 98

(56) References Cited

U.S. PATENT DOCUMENTS 5,777,020 * 7/1998 Nagai .................... 524/451

FOREIGN PATENT DOCUMENTS

| | | |
|---|---|---|
| 0 509 662 | 10/1992 | (EP) . |
| 0 774 489 | 5/1997 | (EP) . |

OTHER PUBLICATIONS

Kakugo et al., "Impact–Resistant Polypropylene", Journal of Sumitomo Chemical Co., pp. 22–29 (1979).*

Gugumus, "Light Stabilizers", Plastics Additives Handbook, ed., Gachter et al., 4th ed., Hanser Publishers, New York, pp. 129, 190–195 (1993).*

* cited by examiner

Primary Examiner—Donald R. Wilson
(74) Attorney, Agent, or Firm—Oblon, Spivak, McClelland, Maier & Neustadt, P.C.

(57) ABSTRACT

There is provided a thermoplastic resin composition comprising the following components (A) to (E): component (A): 50 to 74.7% by weight of a Ziegler-Natta catalyst sequentially polymerized blend of a propylene homopolymer and an ethylene-propylene copolymer, component (B): 5 to 10% by weight of an ethylene-octene random copolymer, component (C): 5 to 10% by weight of an ethylene-butene random copolymer, component (D): 0.3 to 5% by weight of an elastomer.

4 Claims, No Drawings

THERMOPLASTIC POLYPROPYLENE COMPOSITION

BACKGROUND OF THE INVENTION

1. Field of the Invention

This invention relates to a thermoplastic resin composition comprising a propylene-ethylene block copolymer resin, a low crystalline ethylene-octene copolymer, a low crystalline ethylene-butene copolymer, a specific elastomer having a block structure, talc, and a specific additive admixture, which is excellent in terms of processability on injection molding and in the appearance of a molded product, has good flexural modulus, impact resistance, elongation in tension, surface hardness, and heat resistance, and is also excellent in adhesion to a paint film and improved in terms of prevention of mold contamination, and thus is particularly suited for the production of injection-molded products such as automotive interior trims.

2. Background Art

So far, numerous attempts have been made to increase the impact resistance and rigidity of polypropylene resins by the addition thereto of ethylene-propylene copolymers, various ethylene copolymers, and talc. For instance, resin compositions having excellent impact resistance are known from JP-B-63-42929, JP-A-64-150, JP-A-64-66263, and JP-A-1-204946.

However, the composition set forth in the above JP-B-63-42929 is insufficient in flexural modulus and heat resistance due to the use of a polypropylene of not so high crystallinity.

The compositions described in JP-A-64-150, JP-A-64-66263 and JP-A-1-204946, because of their low talc content, are suited for some applications, e.g., bumpers but their flexural modulus is too low for interior trims.

Furthermore, JP-A-4-159345 discloses an ethylene-α-olefin copolymer composition containing a large amount of inorganic filler. This composition has a high specific gravity, and thus is not preferred in the light of weight reduction of automobiles.

In order to reduce the above drawbacks, JP-A-7-53843 has proposed a composition. This composition, however, is unsatisfactory in fluidity for use in applications requiring a higher level of fluidity where molding should be carried out at a low pressure in short cycle times.

Regarding the interior trims, they are in most cases coated with a paint to enhance the commercial value. Unfortunately, however, polypropylene materials for interior trims generally exhibit poor adhesion to a paint film, especially when fats and oils are involved. Therefore, the development of materials having higher adhesion to a paint film has been desired in the art.

On the other hand, there is the following problem with the conventional talc-containing polypropylene composite materials at the time of their molding. Thus, during the long-term continuous molding of the composite materials, bleedouts are gradually deposited on molds, whereby the resulting molded product undesirably exhibits a high gloss. This is particularly pointed out for automotive interior trims. A propylene polymer which provides a solution to this problem while maintaining the physical properties has been proposed in JP-A-5-209094 and JP-A-6-17982. However, this polymer utilizes no weathering agent. In view of the fact that stabilizers used for improving weathering resistance usually exert an adverse influence on the contamination of molds, there is still left much to be desired.

An object of the present invention is to provide a thermoplastic resin composition which has high fluidity, good physical properties and excellent moldability, can provide moldings having good adhesion to a paint film, is improved in terms of prevention of mold contamination, and is especially suited for the production of automotive interior trims such as an instrument panel.

SUMMARY OF THE INVENTION

It has now been found that the above object can be achieved by incorporating an elastomer component having specific crystallinity, an elastomer component having substantially no crystallinity, an elastomer having a block structure as a compatibilizing agent component, talc, and optionally specific additives in specific proportions into a propylene-ethylene block copolymer which contains a propylene homopolymer moiety of high fluidity and high crystallinity.

Thus, the present invention provides a thermoplastic resin composition comprising the following components (A) to (E):

component (A): 50 to 74.7% by weight of a propylene-ethylene block copolymer resin containing a propylene homopolymer moiety having a melt flow rate (MFR) of 20 to 200 g/10 min. and an isotactic pentad fraction of at least 0.98, said block copolymer having an MFR of 10 to 100 g/10 min. and a ratio of the weight average molecular weight (Mw) to the number average molecular weight (Mn), Mw/Mn, of 5 to 7, component (B): 5 to 10% by weight of an ethylene-octene random copolymer having a melting temperature of 40 to 60° C. and an MFR of 0.5 to 15 g/10 min., component (C): 5 to 10% by weight of an ethylene-butene random copolymer not having a melting temperature of 35° C. or above and having an MFR of 0.5 to 15 g/10 min., component (D): 0.3 to 5% by weight of an elastomer, the elastomer being either one comprising a block structure represented by the following formula [I] and/or the following formula [II] and having a melting temperature of 80 to 110° C., an MFR of 0.5 to 20 g/10 min., a polyethylene crystalline moiety content of 20 to 40% by weight, and a random elastomer moiety content of 60 to 80% by weight, or one comprising a block structure represented by the following formula [III], the following formula [IV] and/or the following formula [V] and having a melt flow rate of not more than 15 g/10 min. and a polystyrene moiety content of 10 to 40% by weight and a random elastomer moiety content of 60 to 90% by weight:

polyethylene-(ethylene/butene random elastomer)-polyethylene [I]

polyethylene-(ethylene/butene random elastomer) [II]

polystyrene-(ethylene/butene random elastomer)-polystyrene [III]

polystyrene-(ethylene/propylene random elastomer)-polystyrene [IV]

polystyrene-(ethylene/propylene random elastomer) [V];

and component (E): 15 to 25% by weight of a talc having an average particle diameter of up to 5 μm and a specific surface area of at least 3.5 m$^2$/g.

According to a preferred embodiment of the present invention, the thermoplastic resin composition further comprises the following components (F) and (G):

component (F): 0.05 to 2 parts by weight, based on 100 parts by weight in total of the components (A) to (E), of a hindered amine having a structure represented by the following formula:

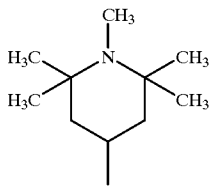

component (G): 0.05 to 4 parts by weight, based on 100 parts by weight in total of the components (A) to (E), of a metal salt represented by the following general formula [VI]:

(RCOO)$_2$X     [VI]

wherein R represents a monovalent hydrocarbon group having a molecular weight of 290 to 500 and X is zinc, magnesium, or calcium.

The thermoplastic resin composition comprising the specific components (A) to (E) in specific proportions has good moldability, can provide a molding having good appearance, has good flexural modulus, impact resistance, elongation in tension, heat resistance, and surface hardness, and is improved in adhesion to a paint film. When the thermoplastic resin composition further comprises the components (F) and (G), the weathering resistance is improved without suffering from the problem of mold contamination. Therefore, the thermoplastic resin composition of the present invention is particularly suited for the production of injection-molded automotive interior components, such as instrument panels.

DETAILED DESCRIPTION OF THE INVENTION

[I] Thermoplastic Resin Composition (1) Components (A) Propylene-Ethylene Block Copolymer (Component (A))

The propylene-ethylene block copolymer (component (A)) to be used in the thermoplastic resin composition of the present invention has a melt flow rate (MFR—measured at 230° C. under a load of 2.16 kg) of 10 to 100 g/10 min., preferably 20 to 80 g/10 min., and more preferably 30 to 60 g/10 min.

If the MFR of the propylene-ethylene block copolymer is below the lower limit of the above range, there will then be obtained a composition poor in fluidity. For molding such a composition into a thin molded article, the use of a molding machine having a large clamping force or an increase in molding temperature is required, adversely affecting the productivity. On the other hand, if the MFR of the propylene-ethylene block copolymer exceeds the upper limit of the above range, there will then be obtained a composition having an insufficient impact resistance.

The above MFR of the propylene-ethylene block copolymer may be adjusted during polymerization, or alternatively may be adjusted after polymerization using organic peroxides such as diacyl peroxides and dialkyl peroxides.

The ratio of the weight average molecular weight (Mw) to the number average molecular weight (Mn), Mw/Mn, representing the molecular weight distribution of the propylene-ethylene block copolymer is 5 to 7, preferably 5.5 to 6.5. When the ratio Mw/Mn is outside the above range, the impact resistance is unsatisfactory. The ratio Mw/Mn is determined by GPC (gel permeation chromatography).

The propylene homopolymer moiety of the propylene-ethylene block copolymer has an MFR of 20 to 200 g/10 min., preferably 30 to 150 g/10 min., more preferably 40 to 100 g/10 min., and an isotactic pentad fraction (P) of at least 0.98, preferably at least 0.985.

When the MFR of the propylene homopolymer moiety in the propylene-ethylene block copolymer is below the lower limit of the above range, the resulting composition has unsatisfactory fluidity. An MFR exceeding the upper limit of the above range, on the other hand, will result in poor impact resistance.

An isotactic pentad fraction (P) of the propylene homopolymer moiety in the propylene-ethylene block copolymer falling below the lower limit of the above range will provide a composition having insufficient flexural modulus.

The term "isotactic pentad fraction (P)" used herein refers to the isotactic fraction of a pentad unit in the polypropylene molecular chain, determined by using $^{13}$C-NMR.

The ethylene content of the propylene-ethylene block copolymer is preferably 2 to 8% by weight, and the ethylene content of the elastomer moiety in the block copolymer is preferably 30 to 50% by weight.

When the ethylene content is below the lower limit of the above range, the heat resistance is likely to become unsatisfactory, while an ethylene content above the upper limit of the above range tends to result in unsatisfactory flexural modulus and surface hardness.

The ethylene content can be determined by means of infrared spectrophotometry.

Preparation of Propylene-Ethylene Block Copolymer

A catalyst of high stereoregularity is used for the preparation of the propylene-ethylene block copolymer.

Such a catalyst may typically be prepared by a method wherein a titanium trichloride composition obtained by reducing titanium tetrachloride with an organoaluminum compound, followed by treatment with an electron donor and an electron acceptor, is combined with an organoaluminum compound and an aromatic carboxylate (see JP-A-56-100806, JP-A-56-120712, and JP-A-58-104907), or a method wherein titanium tetrachloride and an electron donor are brought into contact with a magnesium halide to prepare a supported catalyst (see JP-A-57-63310, JP-A-63-43915, and JP-A-63-83116).

The block copolymerization of propylene and ethylene may be conducted by the vapor-phase fluidized bed, solution, slurry and other methods in the presence of the above catalyst.

Quantitative Ratio

It is important that the amount of the above propylene-ethylene block copolymer (component (A)) used lies within the range of, on the basis of the total amount of the above components (A) to (E), 50 to 74.7% by weight, preferably 53 to 72% by weight, more preferably 55 to 70% by weight.

At an amount below the lower limit of the above range a composition poor in flexural modulus will be obtained, whereas at an amount exceeding the upper limit of the above range a composition of decreased impact resistance will be obtained.

(B) Ethylene-Octene Random Copolymer (Component (B))

The ethylene-octene random copolymer (component (B) to be used in the thermoplastic resin composition of the present invention functions to develop good surface hardness and good adhesion to a paint film while improving the impact resistance. The use of the component (B) in combination with the components (C) and (D) described below can provide a material having both well-balanced physical properties and good adhesion to a paint film.

The component (B) is an elastomer having a melting temperature of 40 to 60° C., preferably 40 to 55° C., as measured with a differential scanning calorimeter (DSC). When the melting temperature exceeds the upper limit of the above range, the adhesion to a paint film is unsatisfactory. On the other hand, when it is below the above range, the surface hardness is unsatisfactory. In this case, the octene content is not particularly limited so far as the melting temperature falls within the above range. The octene content, however, is preferably 15 to 19 mol %, more preferably 16 to 18 mol %, from the viewpoint of the adhesion to a paint film and the surface hardness.

The term "octene content" used herein refers to a value determined by using $^{13}$C-NMR based on Macromolecules (1982) 15, 353–360 and ibid., 1402–1406.

The MFR (230° C., load 2.16 kg) of the ethylene-octene random copolymer is generally 0.5 to 15 g/10 min., preferably 0.75 to 9 g/10 min., particularly preferably 1 to 6 g/10 min. When the MFR of the elastomer is below the lower limit of the above range, the impact resistance is unsatisfactory, while when it exceeds the upper limit of the above range, the Rockwell hardness is unsatisfactory.

A single type or a mixture of two or more types of ethylene-octane random copolymers may be used as the ethylene-octene random copolymer.

The density of the component (B) is preferably not more than 0.90 g/cm$^3$, more preferably 0.86 to 0.89 g/cm$^3$, particularly preferably 0.865 to 0.880 g/cm$^3$, from the viewpoint of the impact resistance and the surface hardness.

The density of the component (B) is measured by punching a specimen having a size of 50 mm×50 mm×1 mm in thickness out of a 1 mm-thick sheet prepared by press molding at 160° C. and then measuring the density with a density gradient tube without annealing.

Preparation of Ethylene-Octene Random Copolymer

The ethylene-octene random copolymer as the component (B) may be prepared in the presence of the so-called Ziegler catalyst comprising a combination of a titanium compound, such as titanium halide, with an organoaluminum-magnesium complex, such as an alkylaluminum-magnesium complex or an alkylalkoxyaluminum complex, an alkylaluminum, an alkylaluminum chloride or the like, a metallocene compound described in WO-91/04257 or the like. Copolymerization in the presence of the metallocene compound can provide a copolymer having better effect.

The random copolymerization of ethylene and octene may be conducted by the vapor-phase fluidized bed, solution, slurry and other methods.

Quantitative Ratio

It is important that the amount of the ethylene-octene random copolymer (component (B)) used lies within the range of, on the basis of the total amount of the above components (A) to (E) in the thermoplastic resin composition of the present invention, 5 to 10% by weight, preferably 6 to 9% by weight.

If the amount of the ethylene-octene random copolymer incorporated is below the lower limit of the above range, the impact resistance and the adhesion to a paint film are unsatisfactory, while if the amount exceeds the upper limit of the above range, the flexural modulus is unsatisfactory.

(C) Ethylene-Butene Random Copolymer (Component (C))

The ethylene-butene random copolymer (component (C)) to be used in the thermoplastic resin composition of the present invention functions to develop good adhesion to a paint film while improving the impact resistance.

The use of the component (C) in combination with the above components (B) and the component (D) described below can provide a material having both well-balanced physical properties and good adhesion to a paint film.

The component (C) is a substantially noncrystalline elastomer not having a melting temperature of 35° C. or above as measured with DSC. If the melting temperature is 35° C. or above, the adhesion to a paint film is unsatisfactory.

The MFR (230° C., load 2.16 kg) of the ethylene-butene random copolymer is generally 0.5 to 15 g/10 min., preferably 1 to 8 g/10 min., particularly preferably 2 to 7 g/10 min.

When the MFR of the elastomer is below the lower limit of the above range, the impact resistance is unsatisfactory, while when it exceeds the upper limit of the above range, the Rockwell hardness is unsatisfactory.

Either a single type or either a mixture of two or more types of ethylene-butene random copolymers may be used as the ethylene-butene random copolymer.

Preparation of Ethylene-Butene Random Copolymer

The above ethylene-butene random copolymer, as with the component (B), may be obtained by the copolymerization of ethylene and butene by the vapor-phase fluidized bed, solution, slurry and other methods in the presence of an ionic polymerization catalyst such as a Ziegler, Phillips, or metallocene catalyst. The butene content is not particularly limited so far as the ethylene-butene copolymer is a substantially noncrystalline elastomeric one. The butene content is preferably more than 25% by weight, more preferably more than 30% by weight, from the viewpoint of improving the impact resistance.

The butene content is determined by using $^{13}$C-NMR based on Macromolecules (1982) 15, 353–360 and ibid., 1402–1406.

Quantitative Ratio

It is important to incorporate the above ethylene-butene random copolymer (component (C)) in the thermoplastic resin composition of the present invention at an amount of 5 to 10% by weight, preferably 6 to 9% by weight, based on the total amount of the components (A) to (E).

If the amount of the ethylene-butene random copolymer incorporated is below the lower limit of the above range, the impact resistance and the adhesion of a paint film are unsatisfactory, while if it exceeds the upper limit of the above range, the flexural modulus is unsatisfactory.

(D) Elastomer Having Block Structure (Component (D))

The elastomer having a block structure (component (D)) to be used in the thermoplastic resin composition of the present invention can promote the impact resistance-improving effect of the components (B) and (C), and the addition of the elastomer even in a small amount can attain the intended effect.

Properties of Elastomer Having Block Structure

In the elastomer having the block structure (component (D)), it is important that the melting temperature of the elastomer comprising a block structure represented by the following formulae [I] and [II] is 80 to 110° C., preferably 90 to 105° C., as measured with a differential scanning calorimeter (DSC). When the melting temperature is outside the above range, the impact resistance is unsatisfactory.

The MFR (230° C., load 2.16 kg) of the elastomer comprising the above block structure is 0.5 to 20 g/10 min, preferably 0.5 to 15 g/10 min. When the MFR is outside the above range, the impact resistance is unsatisfactory.

The elastomer having a block structure represented by the formulae [I] and [II] comprises a polyethylene structure and an elastomer structure as indispensable components, and when the block structure lacks either structure, the above effect is unsatisfactory.

The elastomer having the block structure may have either the following triblock structure [I] or the following diblock structure [II]:

polyethylene-(ethylene/butene random elastomer)-polyethylene [I]

polyethylene-(ethylene/butene random elastomer) [II]

The proportion of the crystalline moiety having the polyethylene structure is 20 to 40% by weight, preferably 23 to 35% by weight. The proportion of the moiety having the elastomer structure is 60 to 80% by weight, preferably 65 to 77% by weight. The content of the butene structure (1,2-conversion) is preferably 60 to 90% by weight, more preferably 65 to 85% by weight.

For each of the crystalline moiety having the polyethylene structure and the moiety having the elastomer structure, when the proportion is outside the above range, the impact resistance is unsatisfactory.

The 1,2-conversion is calculated based on the results of measurement of an infrared absorption spectrum.

In the elastomer having the block structure (component (D)), it is important that the MFR (230° C., load 2.16 kg) of the elastomer comprising a block structure represented by the formulae [III], [IV] and [V] is not more than 15 g/10 min., preferably 0.3 to 15 g/10 min. When the MFR is outside the above range, the impact resistance is unsatisfactory.

The elastomer having a block structure represented by the formulae [III], [IV] and [V] comprises a polystyrene structure and an elastomer structure as indispensable components, and when the block structure lacks either structure, the development of the above property is unsatisfactory.

The elastomer having the block structure may be either the following triblock structure [III] or [IV] or the following diblock structure [V]:

polystyrene-(ethylene/butene random elastomer)-polystyrene [III]

polystyrene-(ethylene/propylene random elastomer)-polystyrene [IV]

polystyrene-(ethylene/propylene random elastomer) [V];

The proportion of the moiety having the polystyrene structure is 10 to 40% by weight, preferably 15 to 35% by weight. The proportion of the moiety having the elastomer structure is 60 to 90% by weight, preferably 65 to 85% by weight.

For each of the moiety having the polystyrene structure and the moiety having the elastomer structure, when the proportion is outside the above range, the impact resistance is likely to be deteriorated.

Preparation of Elastomer Having Block Structure

The above elastomer may be prepared by any method without particular limitation. For example, the elastomers represented by the formulae [I] and [II] may be prepared by the so-called "living polymerization" such as described in JP-A-8-269264.

For example, high 1,4-conversion in a high degree of butadiene in a solvent, such as cyclohexane, in the presence of n-butyl lithium as a polymerization initiator followed by addition of a polar solvent, such as tetrahydrofuran, to regulate the polarity of the solvent can improve the 1,2-conversion.

Hydrogenation in this stage can provide, for example, an elastomer having a diblock structure represented by the formula [II]. On the other hand, coupling treatment with a coupling agent followed by hydrogenation can provide an elastomer having a triblock structure represented by the formula [I].

For the elastomers represented by the formulae [I] and [II] used in the present invention, the 1,2-conversion is preferably 60 to 90% by weight, particularly preferably 65 to 85% by weight.

When the 1,2-conversion is outside the above range, the development of the above property is likely to be unsatisfactory.

For example, the elastomer represented by the formula [III] may be prepared by a method described in U.S. Pat. Nos. 3,595,942 and 4,188,432. Specifically, hydrogenation of a styrene-butadiene-styrene block copolymer at a temperature of 25 to 175° C. in the presence of a catalyst prepared by reducing an alkoxide of cobalt or nickel with an alkylaluminum compound results in selective hydrogenation of the butadiene moiety only to give a structure corresponding to a copolymer of ethylene with butene.

Quantitative Ratio

It is important to incorporate the elastomer having the above block structure (component (D)) at an amount of 0.3 to 5% by weight, preferably 0.5 to 3% by weight, more preferably 0.75 to 3% by weight, based on the total amount of the components (A) to (E) in the thermoplastic resin composition.

If the amount of the elastomer incorporated exceeds the upper limit of the above range, the Rockwell hardness is unsatisfactory, while if it is below the lower limit of the above range, it is impossible to attain the contemplated effect of improving the impact resistance.

(E) Talc (Component (E))

The talc (component (E)) to be used in the thermoplastic resin composition of the present invention has an average particle diameter of up to 5 $\mu$m, and preferably 0.5 to 3 $\mu$m, and a specific surface area of at least 3.5 m$^2$/g, and preferably 3.5 to 6 m$^2$/g. If these parameters are outside the above respective ranges, there will then be obtained a composition of lowered flexural modulus.

The average particle diameter may be determined by reading, at a 50 wt % cumulation, a particle diameter value from a particle size cumulation curve obtained by use of a liquid phase sedimentation type of photo extinction method (using a CP model made by SHIMADZU CORP. as an example).

The specific surface area may be determined from a measurement obtained by use of an air-permeability method (using a constant pressure air-permeation type of specific surface area meter SS-100 made by SHIMADZU CORP. as an example).

Generally, the talc used in the present invention may be prepared, for example, by dry pulverization, and then dry classification.

The talc may have been surface-treated with various organic titanate types of coupling agents, organic silane coupling agents, fatty acids, metal salts of fatty acids, fatty acid esters or the like for the purpose of improving its adhesion to, and its dispersibility in, the polymers.

Quantitative Ratio

It is important to incorporate the talc (component (E)) at an amount of 15 to 25% by weight, and preferably 17 to 23% by weight, based on the total amount of the components (A) to (E) in the thermoplastic resin composition.

If the amount of the talc incorporated is below the lower limit of the above range, there will then be obtained a composition having unsatisfactory flexural modulus, whereas if the amount of the talc incorporated exceeds the upper limit thereof, there will then be obtained a composition having unsatisfactory elongation in tension.

(F) Hindered Amine (component (F))

According to a preferred embodiment of the present invention, the thermoplastic resin composition contains as a weathering agent a hindered amine having a structure represented by the following formula:

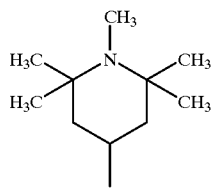

Preferably, the hindered amine has a pentamethylpiperidyl structure, and specific examples thereof include bis (1,2,2,6,6-pentamethyl-4-piperidyl) sebacate; bis (1,2,2,6,6-pentamethyl-4-piperidyl-2-butyl-2-(3,5-di-t-butyl-4-hydroxybenzyl) malonate; tetrakis(1,2,2,6,6-pentamethyl-4-piperidyl)-1,2,3,4-butanetetracarboxylate; tris(1,2,2,6,6-pentamethyl-4-piperidyl)-monostearyl-1,2,3,4-butane tetracarboxylate, distearate, tristearate, and mixtures thereof; condensates of tris(1,2,6,6-pentamethyl-4-piperidyl-1,2,3,4-butane tetracarboxylate and β,β,β',β'-tetramethyl-3,9-[2,4,8,10-tetraoxaspiro(5,5)undecane] diethanol; and condensates of N,N'-bis(3-aminopropyl) ethylenediamine and 2,4-bis[N-butyl-N-(1,2,2,6,6-pentamethyl-4-piperidyl)amino]-6-chloro-1,3,5-triazine.

These hindered amine compounds are preferred because manifest weathering resistance without contamination of molds.

Quantitative Ratio

The amount of the hindered amine additive (component (F)) incorporated lies within the range of 0.05 to 2 parts by weight, preferably 0.08 to 0.5 parts by weight, and more preferably 0.1 to 0.3 parts by weight, based on 100 parts by weight of the components (A) to (E).

If the amount of the hindered amine additive incorporated exceeds the upper limit of the above range, molds will then be unfavorably contaminated, whereas if the amount thereof is below the lower limit, its practical weathering resistance performance will then drop.

(G) Metal Salt (component (G))

According to a preferred embodiment of the present invention, a metal salt represented by the following general formula [VI] is used as a dispersant:

(RCOO)$_2$X    [VI]

wherein R is a monovalent hydrocarbon group having a molecular weight of 290 to 500, preferably 290 to 400, and X is zinc, magnesium or calcium.

The above metal salt is used as a dispersant for both talc and a pigment to be used for coloration. To achieve further improved prevention of mold contamination, it is important to use the metal salt represented by the above general formula [VI].

If the molecular weight of the above R is less than the lower limit of the above range, molds will then be likely to be contaminated, whereas if the molecular weight of the R exceeds the upper limit, the dispersibility of the talc and pigment will then become worse.

Examples of the metal salt include calcium, magnesium, and zinc salts of behenic acid, montanic acid, mellisic acid, cerotic acid and lignoceric acid.

Preferred among these metal salts are the calcium, magnesium, and zinc salts of behenic acid as well as the zinc, calcium, and magnesium salts of montanic acid.

Quantitative Ratio

The amount of the metal salt (component(G)) incorporated lies within the range of 0.05 to 4 parts by weight, preferably 0.1 to 2 parts by weight, and more preferably 0.2 to 1 part by weight, based on 100 parts by weight in total of components (A) to (E).

If the amount of the metal salt exceeds the upper limit of the above range, molds will then be unfavorably contaminated, whereas if the amount of the metal salt is below the lower limit, the physical properties of the resulting composition will be lowered due to a drop of the dispersibility of the pigment, talc, or the like.

(H) Additional (Optional) Components

Besides the above components (A) to (G), the thermoplastic resin composition of the present invention may contain additional components with the proviso that they have little, if any, adverse influence on the intended effect according to the present invention.

Examples of additional components usable herein include phenolic, sulfur, and phosphorus anti-oxidants; benzophenone, benzotriazole and other weathering stabilizers; organoaluminum compounds, organophosphorus compounds, sorbitol compounds and other nucleating agents: various dispersants; coloring materials such as quinacridone, perylene, phthalocyanine, titanium oxide, and carbon black; and fibrous materials such as fibrous potassium titanate, fibrous magnesium oxysulfate, fibrous aluminum borate, a whisker form of calcium carbonate, carbon fibers, and glass fibers.

Among others, triaryl phosphites, such as tris-(2,4-di-t-butylphenyl)phosphite, as the anti-oxidant are effective in preventing hydrolysis resistance, stability against processing at a high temperature, and prevention of mold contamination.

(2) Preparation of Thermoplastic Resin Composition (A) Kneading

The thermoplastic resin composition of the present invention can be prepared by kneading the above components together at a preset temperature of 180 to 250° C. using conventional extruders, Banbury mixers, rolls, Brabender Plastographs, kneader brabenders, etc. It is particularly preferable to prepare the thermoplastic resin composition using an extruder, especially a twin-screw extruder.

(B) Molding

Methods of molding the thermoplastic resin composition of the present invention are not limited. In view of the effect of the present invention achieved, however, it is preferable to use injection molding.

[II] Physical Properties of Thermoplastic Resin Composition

The thermoplastic resin composition of the present invention is excellent in injection moldability as well as in flexural modulus, impact resistance, elongation in tension, surface hardness and heat resistance, and in addition can develop good adhesion to a film of a paint for automotive interior trims and is satisfactory in prevention of mold contamination.

(a) MFR: at least 20 g/10 min., preferably at least 25 g/10 min.

(b) Flexural Modulus: at least 20,000 kg/cm$^2$, preferably 23,000 to 28,000 kg/cm$^2$ (c) Izod Impact Value: at least 15 kg·cm/cm, preferably at least 18 kg·cm/cm (d) Elongation in Tension: at least 400%, preferably at least 500%

(e) Rockwell Hardness: at least 75, preferably at least 80

(f) Heat Deformation Temperature: at least 120° C., preferably at least 130° C.

[III] Applications

The thermoplastic resin composition of the present invention, thanks to the excellent properties as mentioned above, can advantageously be molded into various articles, especially injection-molded automotive interior trims, such as instrument panels, door trims, pillar trims, console boxes and the like.

The following examples and comparative examples further illustrate the present invention but are not intended to limit it.

[I] Measuring Method (1) MFR: measured at 230° C. under a load of 2.16 kg according to ASTM-D1238.

(2) Isotactic Pentad Fraction (P): determined according to the procedure described in "Macromolecule", 8, 687 (1975) using $^{13}$C-NMR.

(3) Ratio of the weight average molecular weight to number average molecular weight (Mw/Mn): measured by GPC (gel permeation chromatography).

(4) Melting Temperature: determined from a peak position in a thermogram as obtained by using a differential scanning calorimeter (DSC), when a sample was melted by heating to a temperature of 180° C., then cooled down to a temperature of −100° C. at a cooling rate of 10° C. per minute, and finally heated at a heating rate of 10° C. per minute.

(5) Flexural Modulus determined at 23° C. and a flexing rate of 2 mm per minute according to ASTM-D790.

(6) Impact Resistance: estimated in terms of an Izod impact value at 23° C. according to ASTM-D790.

(7) Elongation in Tension: determined by conducting tensile testing at 23° C. and a tensile rate of 10 mm per minute according to ASTM-D638, and measuring the percentage of elongation.

(8) Surface Hardness: determined by making estimation of a Rockwell hardness at 23° C. on an R scale according to ASTM-D785.

(9) Heat Deformation Temperature (HDT): measured under a load of 4.6 kg according to ASTM-D648.

(10) Adhesion to Paint Film (Resistance to Contamination with Fats and Oils): A test piece having a geometry of 120 mm square×3 mm in thickness was molded using a mold with an embossed surface (corresponding to grain C specified by Toyota Motor Co., Ltd.) by means of a 100-ton molding machine. A paint for an automotive interior trim (Planet PP-7, manufactured by Origin Electric Co., Ltd.) was coated on the test piece, and the coating was heat-treated at a temperature of 60° C. for 5 min., thereby forming a paint film. Thereafter, a beef tallow reagent (a beef tallow, manufactured by Nacali Tesuque Inc.) was coated at a coverage of 2 g/cm$^2$, and the coating was heat-treated at a temperature of 80° C. for 7 days in an oven.

2-mm square cuts were provided in the test piece by means of a cutter. A cellophane tape manufactured by Nichiban Co., Ltd. was applied thereto and then separated therefrom to visually inspect the peeling of the paint film, and the adhesion of the test piece to the paint film was evaluated according to the following criteria.

○: Not peeled at all

Δ: Partially peeled

X: Entirely or almost entirely peeled

(11) Mold Contamination: estimated by molding into 350 mm×100 mm×3 mmt test pieces in 2,000 shot cycles using a mold having embosses of 180 to 220 μm in depth, in which additional embosses of 0.5 to 15 μm in depth were provided on the whole surface for matting, and measuring a gloss change of the embossed portion of the mold between the first shot cycle and the 2,000-th shot cycle. A gloss change of up to 1.0 is marked with ○, and a gloss change greater than 1.0 with X.

(12) Weathering Resistance: estimated using a fadeometer (FAL-AU·H made by Suga Shikenkisha, with a black panel at 83° C. under non-rainy conditions). Samples that cracked within 1,000 hours are marked with X, and samples that did not with ○.

EXAMPLES 1 TO 16 AND COMPARATIVE EXAMPLES 1 TO 21

Starting materials shown in Tables 1 to 6 were blended together at proportions indicated in Tables 7 to 9 with the addition of 0.1 part by weight of tetrakis[methylene-3-(3', 5'-di-t-butyl-4'-hydroxyphenyl) propionate]methane (IRGANOX 1010, manufactured by CIBA-GEYGY LTD.) and 0.4 part by weight of magnesium stearate. The blend was mixed by use of a super-mixer made by Kawada Seisakusho for 5 minutes, and then kneaded and granulated at a preset temperature of 210° C. by means of a biaxial kneader (2FCM made by KOBE STEEL LTD.) to obtain a thermoplastic resin composition.

Thereafter, the thermoplastic resin composition was molded into various test pieces at a molding temperature of 210° C. using an injection molding machine having a clamping force of 350 tons, and the test pieces were measured for MFR, flexural modulus, Izod impact value, elongation in tension, thermal deformation temperature, adhesion to a paint film (resistance to contamination with fats and oils) according to the above measuring methods. The results of evaluation are reported in Tables 10 to 12.

TABLE 1

Component (A) : Propylene-Ethylene Block Copolymer

| | Propylene Homopolymer Moiety | | | | |
|---|---|---|---|---|---|
| Type | MFR g/10 min. | Isotactic Pentad Fraction | MFR g/10 min. | Ethylene Content wt % | Molecular Weight Distribution Mw/Mn |
| PP-1 | 81 | 0.988 | 50 | 3.8 | 5.7 |
| PP-2 | 125 | 0.983 | 68 | 4.1 | 5.8 |
| PP-3 | 50 | 0.991 | 28 | 4.3 | 6.3 |
| PP-4 | 210 | 0.981 | 120 | 3.9 | 5.2 |
| PP-5 | 14 | 0.981 | 8 | 4.1 | 6.1 |
| PP-6 | 77 | 0.963 | 48 | 4.1 | 5.5 |
| PP-7 | 120 | 0.989 | 49 | 4.8 | 8.3 |
| PP-8 | 53 | 0.985 | 53 | 3.9 | 4.4 |

TABLE 2

Component (B) : Ethylene-Octene Copolymer

| Type | MFR g/10 min. | Melting Temp. °C. | Density g/cm³ | Octene Content mol % |
|---|---|---|---|---|
| PEX-1 | 1.8 | 48 | 0.866 | 16 |
| PEX-2 | 5 | 45.5 | 0.865 | 16 |
| PEX-3 | 1.3 | 46 | 0.865 | 16 |
| PEX-4 | 9.3 | 65 | 0.872 | 13 |
| PEX-5 | 8 | ° C. or below | 0.856 | 19 |
| PEX-6 | 30 | 45 | 0.865 | 13 |
| PEX-7 | 0.4 | 47 | 0.867 | 16 |

TABLE 3

Component (C): Ethylene-Butene Copolymer

| Type | MFR g/10 min. | Melting Temp. °C. | Density g/cm³ | Butene Content wt % |
|---|---|---|---|---|
| EBM-1 | 6.5 | 29 | 0.864 | 33 |
| EBM-2 | 10 | 27 | 0.864 | 33 |
| EBM-3 | 2.5 | 31 | 0.863 | 32 |
| EBM-4 | 40 | 32 | 0.864 | 33 |
| EBM-5 | 0.4 | 27 | 0.863 | 32 |
| EBM-6 | 6.5 | 71.5 | 0.887 | 18 |

TABLE 4

Component (D) : Elastomer Having Block Structure

| Type | MFR g/10 min. | Melting Temp. °C. | Polyethylene Moiety Content wt % | Elastomer Moiety Content wt % | 1,2- Conversion wt % | Structure |
|---|---|---|---|---|---|---|
| Elastomer-1 | 2.8 | 99.7 | 30 | 70 | 78 | Triblock |
| Elastomer-2 | 13 | 99.9 | 27 | 73 | 74 | Triblock |
| Elastomer-3 | 1.2 | 98.3 | 29 | 71 | 70 | Triblock |
| Elastomer-4 | 100 | 99.2 | 28 | 72 | 75 | Triblock |
| Elastomer-5 | 0.1 | 98 | 31 | 69 | 74 | Triblock |
| Elastomer-6 | 2.5 | 113 | 80 | 20 | 80 | Triblock |
| Elastomer-7 | 3.1 | 45 | 5 | 95 | 76 | Triblock |
| Elastomer-8 | 2.2 | 99.5 | 32 | 68 | 73 | Diblock |

TABLE 5

Component (D) : Elastomer Having Block Structure

| Type | MFR g/10 min. | Polystyrene Moiety wt % | Elastomer Moiety wt % | | Structure |
|---|---|---|---|---|---|
| Elastomer-9 | 12.0 | 20 | Ethylene/butene | 80 | Triblock |
| Elastomer-10 | 3.5 | 30 | Ethylene/propylene | 70 | Triblock |
| Elastomer-11 | 0.4 | 37 | Ethylene/propylene | 63 | Diblock |

TABLE 6

Component (E) : Talc

| Type | Average Particle Diameter μm | Specific Surface Area m²/g |
|---|---|---|
| Talc-1 | 2.8 | 4.0 |
| Talc-2 | 6.8 | 2.8 |

TABLE 7

|  | Component (A) | | Component (B) | | Component (C) | | Component (D) | | Talc | |
| --- | --- | --- | --- | --- | --- | --- | --- | --- | --- | --- |
|  | Type | Amount wt % | Type | Amount wt % | Type | Amount wt % | Type | Amount wt % | Type | Amount wt % |
| Ex. 1 | PP-1 | 63 | PEX-1 | 8 | EBM-1 | 8 | Elastomer-1 | 1 | Talc-1 | 20 |
| Ex. 2 | PP-1 | 61 | PEX-1 | 9 | EBM-1 | 9 | Elastomer-1 | 1 | Talc-1 | 20 |
| Ex. 3 | PP-1 | 67 | PEX-1 | 6 | EBM-1 | 6 | Elastomer-1 | 1 | Talc-1 | 20 |
| Ex. 4 | PP-1 | 58 | PEX-1 | 8 | EBM-1 | 8 | Elastomer-1 | 1 | Talc-1 | 25 |
| Ex. 5 | PP-1 | 66 | PEX-1 | 8 | EBM-1 | 8 | Elastomer-1 | 1 | Talc-1 | 17 |
| Ex. 6 | PP-1 | 61 | PEX-1 | 8 | EBM-1 | 8 | Elastomer-1 | 3 | Talc-1 | 20 |
| Ex. 7 | PP-2 | 63 | PEX-1 | 8 | EBM-1 | 8 | Elastomer-1 | 1 | Talc-1 | 20 |
| Ex. 8 | PP-3 | 63 | PEX-1 | 8 | EBM-1 | 8 | Elastomer-1 | 1 | Talc-1 | 20 |
| Ex. 9 | PP-1 | 63 | PEX-3 | 8 | EBM-2 | 8 | Elastomer-1 | 1 | Talc-1 | 20 |
| Ex. 10 | PP-1 | 63 | PEX-2 | 8 | EBM-3 | 8 | Elastomer-1 | 1 | Talc-1 | 20 |
| Ex. 11 | PP-1 | 63 | PEX-1 | 8 | EBM-1 | 8 | Elastomer-2 | 1 | Talc-1 | 20 |
| Ex. 12 | PP-1 | 63 | PEX-1 | 8 | EBM-1 | 8 | Elastomer-3 | 1 | Talc-1 | 20 |
| Ex. 13 | PP-1 | 63 | PEX-1 | 8 | EBM-1 | 8 | Elastomer-8 | 1 | Talc-1 | 20 |
| Ex. 14 | PP-1 | 67 | PEX-1 | 6 | EBM-1 | 6 | Elastomer-9 | 1 | Talc-1 | 20 |
| Ex. 15 | PP-1 | 67 | PEX-1 | 6 | EBM-1 | 6 | Elastomer-10 | 1 | Talc-1 | 20 |
| Ex. 16 | PP-1 | 67 | PEX-1 | 6 | EBM-1 | 6 | Elastomer-11 | 1 | Talc-1 | 20 |

TABLE 8

|  | Component (A) | | Component (B) | | Component (C) | | Component (D) | | Talc | |
| --- | --- | --- | --- | --- | --- | --- | --- | --- | --- | --- |
|  | Type | Amount wt % | Type | Amount wt % | Type | Amount wt % | Type | Amount wt % | Type | Amount wt % |
| Comp. Ex. 1 | PP-1 | 73 | PEX-1 | 3 | EBM-1 | 3 | Elastomer-1 | 1 | Talc-1 | 20 |
| Comp. Ex. 2 | PP-1 | 47 | PEX-1 | 21 | EBM-1 | 11 | Elastomer-1 | 1 | Talc-1 | 20 |
| Comp. Ex. 3 | PP-1 | 68 | PEX-1 | 6 | EBM-1 | 6 | Elastomer-1 | 0 | Talc-1 | 20 |
| Comp. Ex. 4 | PP-1 | 53 | PEX-1 | 10 | EBM-1 | 6 | Elastomer-1 | 11 | Talc-1 | 20 |
| Comp. Ex. 5 | PP-1 | 73 | PEX-1 | 10 | EBM-1 | 6 | Elastomer-1 | 1 | Talc-1 | 10 |
| Comp. Ex. 6 | PP-1 | 56 | PEX-1 | 6 | EBM-1 | 6 | Elastomer-1 | 1 | Talc-1 | 30 |
| Comp. Ex. 7 | PP-4 | 66 | PEX-1 | 6 | EBM-1 | 6 | Elastomer-1 | 1 | Talc-1 | 20 |
| Comp. Ex. 8 | PP-5 | 63 | PEX-1 | 8 | EBM-1 | 8 | Elastomer-1 | 1 | Talc-1 | 20 |
| Comp. Ex. 9 | PP-6 | 63 | PEX-1 | 7 | EBM-1 | 9 | Elastomer-1 | 1 | Talc-1 | 20 |
| Comp. Ex. 10 | PP-7 | 66 | PEX-1 | 6 | EBM-1 | 6 | Elastomer-1 | 1 | Talc-1 | 20 |
| Comp. Ex. 11 | PP-8 | 66 | PEX-1 | 6 | EBM-1 | 6 | Elastomer-1 | 1 | Talc-1 | 20 |

TABLE 9

|  | Component (A) | | Component (B) | | Component (C) | | Component (D) | | Talc | |
| --- | --- | --- | --- | --- | --- | --- | --- | --- | --- | --- |
|  | Type | Amount wt % | Type | Amount wt % | Type | Amount wt % | Type | Amount wt % | Type | Amount wt % |
| Comp. Ex. 12 | PP-1 | 63 | PEX-4 | 9 | EBM-1 | 7 | Elastomer-1 | 1 | Talc-1 | 20 |
| Comp. Ex. 13 | PP-1 | 63 | PEX-5 | 9 | EBM-1 | 7 | Elastomer-1 | 1 | Talc-1 | 20 |
| Comp. Ex. 14 | PP-1 | 63 | PEX-6 | 8 | EBM-4 | 8 | Elastomer-1 | 1 | Talc-1 | 20 |
| Comp. Ex. 15 | PP-1 | 67 | PEX-7 | 6 | EBM-5 | 6 | Elastomer-1 | 1 | Talc-1 | 20 |
| Comp. Ex. 16 | PP-1 | 63 | PEX-1 | 8 | EBM-6 | 8 | Elastomer-1 | 1 | Talc-1 | 20 |
| Comp. Ex. 17 | PP-1 | 67 | PEX-4 | 6 | EBM-3 | 6 | Elastomer-4 | 1 | Talc-1 | 20 |
| Comp. Ex. 18 | PP-1 | 67 | PEX-4 | 6 | EBM-3 | 6 | Elastomer-5 | 1 | Talc-1 | 20 |
| Comp. Ex. 19 | PP-1 | 67 | PEX-4 | 6 | EBM-3 | 6 | Elastomer-6 | 1 | Talc-1 | 20 |
| Comp. Ex. 20 | PP-1 | 67 | PEX-4 | 6 | EBM-3 | 6 | Elastomer-7 | 1 | Talc-1 | 20 |
| Comp. Ex. 21 | PP-1 | 61 | PEX-1 | 9 | EBM-1 | 9 | Elastomer-1 | 1 | Talc-2 | 20 |

TABLE 10

|  | MFR g/10 min. | Flexural Modulus kg/cm² | IZOD Impact Strength kg · cm/cm | Elongation in Tension % | Surface Hardness | HDT ° C. | Adhesion to Paint Film |
|---|---|---|---|---|---|---|---|
| Ex. 1 | 29.3 | 25,300 | 27 | 500 or more | 81 | 131 | ○ |
| Ex. 2 | 27.6 | 24,000 | 48 | 500 or more | 78 | 128 | ○ |
| Ex. 3 | 33 | 27,100 | 17 | 500 or more | 86 | 134 | ○ |
| Ex. 4 | 27.5 | 29,000 | 29 | 500 or more | 78 | 134 | ○ |
| Ex. 5 | 30.9 | 23,800 | 20 | 500 or more | 81 | 128 | ○ |
| Ex. 6 | 28 | 24,300 | 33 | 500 or more | 78 | 128 | ○ |
| Ex. 7 | 36 | 26,000 | 20 | 500 or more | 82 | 132 | ○ |
| Ex. 8 | 20 | 25,000 | 45 | 500 or more | 80 | 130 | ○ |
| Ex. 9 | 28.5 | 24,900 | 26 | 500 or more | 82 | 131 | ○ |
| Ex. 10 | 29.2 | 24,100 | 30 | 500 or more | 80 | 130 | ○ |
| Ex. 11 | 30.5 | 24,200 | 28 | 500 or more | 80 | 130 | ○ |
| Ex. 12 | 29 | 25,000 | 20 | 500 or more | 81 | 132 | ○ |
| Ex. 13 | 29.6 | 25,500 | 25 | 500 or more | 81 | 133 | ○ |
| Ex. 14 | 33.8 | 26,800 | 19 | 500 or more | 85 | 133 | ○ |
| Ex. 15 | 33.3 | 26,700 | 18 | 500 or more | 86 | 135 | ○ |
| Ex. 16 | 30.6 | 27,300 | 16 | 500 or more | 85 | 134 | ○ |

TABLE 11

|  | MFR g/10 min. | Flexural Modulus kg/cm² | IZOD Impact Strength kg · cm/cm | Elongation in Tension % | Surface Hardness | HDT ° C. | Adhesion to Paint Film |
|---|---|---|---|---|---|---|---|
| Comp. Ex. 1 | 40 | 30,800 | 6 | 30 | 95 | 139 | x |
| Comp. Ex. 2 | 16.5 | 17,600 | 50 or more | 500 or more | 59 | 118 | ○ |
| Comp. Ex. 3 | 33.9 | 27,200 | 13 | 500 or more | 86 | 134 | Δ |
| Comp. Ex. 4 | 20.5 | 19,000 | 50 or more | 500 or more | 62 | 122 | ○ |
| Comp. Ex. 5 | 29.8 | 18,800 | 50 or more | 500 or more | 78 | 124 | ○ |
| Comp. Ex. 6 | 31.5 | 31,000 | 38 | 33 | 79 | 136 | Δ |
| Comp. Ex. 7 | 65.3 | 26,900 | 8 | 15 | 87 | 133 | ○ |
| Comp. Ex. 8 | 7 | 24,000 | 50 or more | 500 or more | 80 | 129 | ○ |
| Comp. Ex. 9 | 29.6 | 19,200 | 29 | 500 or more | 69 | 123 | ○ |
| Comp. Ex. 10 | 32.1 | 26,900 | 12 | 420 | 80 | 133 | Δ |
| Comp. Ex. 11 | 35 | 27,200 | 13 | 500 or more | 80 | 131 | ○ |

TABLE 12

|  | MFR g/10 min. | Flexural Modulus kg/cm² | IZOD Impact Strength kg · cm/cm | Elongation in Tension % | Surface Hardness | HDT ° C. | Adhesion to Paint Film |
|---|---|---|---|---|---|---|---|
| Comp. Ex. 12 | 33.2 | 25,000 | 30 | 500 or more | 83 | 130 | x |
| Comp. Ex. 13 | 32.9 | 24,400 | 39 | 500 or more | 74 | 127 | ○ |
| Comp. Ex. 14 | 45.1 | 23,900 | 18 | 500 or more | 73 | 129 | Δ |
| Comp. Ex. 15 | 23.3 | 27,900 | 8 | 305 | 83 | 133 | ○ |
| Comp. Ex. 16 | 29.5 | 25,600 | 24 | 500 or more | 84 | 131 | x |
| Comp. Ex. 17 | 33.5 | 26,800 | 13 | 500 or more | 85 | 130 | ○ |
| Comp. Ex. 18 | 33 | 27,300 | 13 | 500 or more | 86 | 133 | ○ |
| Comp. Ex. 19 | 32.9 | 27,000 | 11 | 500 or more | 85 | 133 | ○ |
| Comp. Ex. 20 | 28.1 | 24,800 | 14 | 500 or more | 78 | 129 | ○ |
| Comp. Ex. 21 | 29 | 19,000 | 18 | 500 or more | 80 | 127 | ○ |

EXAMPLES 17 TO 24 AND COMPARATIVE EXAMPLES 22 TO 36

Starting materials shown in Tables 13 to 19 were blended together at proportions indicated in Tables 20 and 21 with the addition of 0.1 part by weight of tetrakis [methylene-3-(3',5'-di-t-butyl-4'-hydroxyphenyl) propionate]methane (IRGANOX 1010, manufactured by CIBA-GEYGY LTD.) and 0.05 part by weight of tris-(2,4-di-t-butylphenyl) phosphite. The blend was mixed by use of a super-mixer made by Kawada Seisakusho for 5 minutes, and then kneaded and granulated at a preset temperature of 210° C. by means of a biaxial kneader (FCM made by KOBE STEEL LTD.) to obtain a thermoplastic resin composition.

Thereafter, the thermoplastic resin composition was molded into various test pieces at a molding temperature of 210° C. using an injection molding machine having a clamping force of 350 tons and 100 tons, and the test pieces were measured for MFR, flexural modulus, Izod impact value, elongation in tension, surface hardness, thermal deformation temperature, adhesion to a paint film (resistance to contamination with fats and oils), prevention of mold contamination, and weathering resistance according to the above measuring methods.

The results of evaluation are reported in Tables 22 and 23.

TABLE 13

Component (A) : Propylene-Ethylene Block Copolymer

| Type | Propylene Homopolymer Moiety | | MFR g/10 min. | Ethylene Content wt % | Molecular Weight Distribution Mw/Mn |
|---|---|---|---|---|---|
| | MFR g/10 min. | Isotactic Pentad Fraction | | | |
| PP-9 | 85 | 0.988 | 53 | 3.7 | 5.8 |
| PP-10 | 110 | 0.987 | 65 | 3.9 | 5.8 |
| PP-11 | 12 | 0.982 | 7 | 4.0 | 5.9 |
| PP-12 | 195 | 0.981 | 114 | 4.0 | 5.3 |

TABLE 14

Component (B) : Ethylene-Octene Random Copolymer

| Type | MFR g/10 min. | Melting Temp. °C. | Density g/cm³ | Octene Content mol % |
|---|---|---|---|---|
| PEX-8 | 2.0 | 48 | 0.866 | 16 |
| PEX-9 | 5.2 | 46 | 0.865 | 16 |
| PEX-10 | 8.9 | 64 | 0.872 | 13 |
| PEX-11 | 28.0 | 45 | 0.866 | 13 |

TABLE 15

Component (C) : Ethylene-Butene Random Copolymer

| Type | MFR g/10 min. | Melting Temp. °C. | Density g/cm³ | Butene Content wt % |
|---|---|---|---|---|
| EBM-7 | 7.1 | 28 | 0.864 | 33 |
| EBM-8 | 3.5 | 31 | 0.864 | 32 |
| EBM-9 | 40.0 | 31 | 0.863 | 32 |
| EBM-10 | 6.8 | 70 | 0.888 | 18 |

TABLE 17

Component (E) : Talc

| Type | Average Particle Diameter (μm) | Specific Surface Area (m²/g) |
|---|---|---|
| Talc-3 | 2.7 | 4.1 |
| Talc-4 | 9.7 | 2.3 |

TABLE 18

Component (F) : Hindered Amine

| Type | Name of Compound |
|---|---|
| HALS-1 | Bis (1,2,2,6,6-pentamethyl-4-piperidyl) sebacate |
| HALS-2 | Tetrakis (1,2,2,6,6-pentamethyl-4-piperidyl)-1,2,3,4-butane tetracarboxylate |
| HALS-3 | Bis (2,2,6,6-tetramethyl-4-piperidyl) sebacate |

TABLE 16

Component (D): Elastomer Having Block Structure

| Type | MFR g/10 min. | Polyethylene Moiety wt % | Polystyrene Moiety wt % | Elastomer Moiety wt % | Melting Temp. °C. | 1,2-Conversion wt % | Structure |
|---|---|---|---|---|---|---|---|
| Elastomer-12 | 3.0 | 30 | — | Ethylene/butene 70 | 99.7 | 78 | Triblock |
| Elastomer-13 | 2.5 | 32 | — | Ethylene/butene 68 | 99.5 | 73 | Diblock |
| Elastomer-14 | 11.5 | — | 20 | Ethylene/butene 80 | — | — | Triblock |
| Elastomer-15 | 0.5 | — | 37 | Ethylene/propylene 63 | — | — | Diblock |
| Elastomer-16 | 110 | 28 | — | Ethylene/butene 72 | 99.0 | 75 | Triblock |
| Elastomer-17 | 3.0 | 5 | — | Ethylene/butene 95 | 45.3 | 76 | Triblock |

TABLE 19

| Component (G) : Metal Salt | |
|---|---|
| Type | Name of Compound |
| Metal Salt-1 | Calcium behenate |
| Metal Salt-2 | Magnesium stearate |

TABLE 20

| | Component (A) | | Component (B) | | Component (C) | | Component (D) | | Component (E) | | Component (F) | | Component (G) | |
|---|---|---|---|---|---|---|---|---|---|---|---|---|---|---|
| | Type | Amount wt % | Type | Amount wt % | Type | Amount wt % | Type | Amount wt % | Type | Amount wt % | Type | Amount pts. wt. | Type | Amount pts. wt. |
| Ex. 17 | PP-9 | 65 | PEX-8 | 7 | EBM-7 | 7 | Elasto-mer-12 | 1 | Talc-3 | 20 | HALS-1 | 0.2 | Metal Salt-1 | 0.4 |
| Ex. 18 | PP-9 | 62 | PEX-8 | 7 | EBM-7 | 7 | Elasto-mer-12 | 1 | Talc-3 | 23 | HALS-1 | 0.2 | Metal Salt-1 | 0.4 |
| Ex. 19 | PP-10 | 65 | PEX-8 | 7 | EBM-7 | 7 | Elasto-mer-12 | 1 | Talc-3 | 20 | HALS-1 | 0.2 | Metal Salt-1 | 0.4 |
| Ex. 20 | PP-9 | 65 | PEX-9 | 7 | EBM-8 | 7 | Elasto-mer-12 | 1 | Talc-3 | 20 | HALS-1 | 0.2 | Metal Salt-1 | 0.4 |
| Ex. 21 | PP-9 | 65 | PEX-8 | 7 | EBM-7 | 7 | Elasto-mer-13 | 1 | Talc-3 | 20 | HALS-1 | 0.2 | Metal Salt-1 | 0.4 |
| Ex. 22 | PP-9 | 65 | PEX-8 | 7 | EBM-7 | 7 | Elasto-mer-14 | 1 | Talc-3 | 20 | HALS-1 | 0.2 | Metal Salt-1 | 0.4 |
| Ex. 23 | PP-9 | 65 | PEX-8 | 7 | EBM-7 | 7 | Elasto-mer-15 | 1 | Talc-3 | 20 | HALS-1 | 0.2 | Metal Salt-1 | 0.4 |
| Ex. 24 | PP-9 | 65 | PEX-8 | 7 | EBM-7 | 7 | Elasto-mer-12 | 1 | Talc-3 | 20 | HALS-2 | 0.2 | Metal Salt-1 | 0.4 |

TABLE 21

| | Component (A) | | Component (B) | | Component (C) | | Component (D) | | Component (E) | | Component (F) | | Component (G) | |
|---|---|---|---|---|---|---|---|---|---|---|---|---|---|---|
| | Type | Amount wt % | Type | Amount wt % | Type | Amount wt % | Type | Amount wt % | Type | Amount wt % | Type | Amount pts. wt. | Type | Amount pts. wt. |
| Comp. Ex. 22 | PP-9 | 73 | PEX-8 | 3 | EBM-7 | 3 | Elasto-mer-12 | 1 | Talc-3 | 20 | HALS-1 | 0.2 | Metal Salt-1 | 0.4 |
| Comp. Ex. 23 | PP-9 | 49 | PEX-8 | 15 | EBM-7 | 15 | Elasto-mer-12 | 1 | Talc-3 | 20 | HALS-1 | 0.2 | Metal Salt-1 | 0.4 |
| Comp. Ex. 24 | PP-9 | 66 | PEX-8 | 7 | EBM-7 | 7 | — | — | Talc-3 | 20 | HALS-1 | 0.2 | Metal Salt-1 | 0.4 |
| Comp. Ex. 25 | PP-9 | 65 | PEX-9 | 7 | EBM-8 | 7 | Elasto-mer-12 | 1 | Talc-3 | 20 | — | — | Metal Salt-1 | 0.4 |
| Comp. Ex. 26 | PP-9 | 65 | PEX-8 | 7 | EBM-7 | 7 | Elasto-mer-12 | 1 | Talc-3 | 20 | HALS-3 | 0.2 | Metal Salt-1 | 0.4 |
| Comp. Ex. 27 | PP-9 | 65 | PEX-8 | 7 | EBM-7 | 7 | Elasto-mer-12 | 1 | Talc-3 | 20 | HALS-1 | 0.2 | Metal Salt-1 | 5.0 |
| Comp. Ex. 28 | PP-9 | 65 | PEX-8 | 7 | EBM-7 | 7 | Elasto-mer-12 | 1 | Talc-3 | 20 | HALS-1 | 0.2 | Metal Salt-2 | 0.4 |
| Comp. Ex. 29 | PP-11 | 65 | PEX-8 | 7 | EBM-7 | 7 | Elasto-mer-12 | 1 | Talc-3 | 20 | HALS-1 | 0.2 | Metal Salt-1 | 0.4 |
| Comp. Ex. 30 | PP-12 | 65 | PEX-8 | 7 | EBM-7 | 7 | Elasto-mer-12 | 1 | Talc-3 | 20 | HALS-1 | 0.2 | Metal Salt-1 | 0.4 |
| Comp. Ex. 31 | PP-9 | 65 | PEX-10 | 7 | EBM-7 | 7 | Elasto-mer-12 | 1 | Talc-3 | 20 | HALS-1 | 0.2 | Metal Salt-1 | 0.4 |
| Comp. Ex. 32 | PP-9 | 65 | PEX-11 | 7 | EBM-9 | 7 | Elasto-mer-12 | 1 | Talc-3 | 20 | HALS-1 | 0.2 | Metal Salt-1 | 0.4 |
| Comp. Ex. 33 | PP-9 | 65 | PEX-8 | 7 | EBM-10 | 7 | Elasto-mer-12 | 1 | Talc-3 | 20 | HALS-1 | 0.2 | Metal Salt-1 | 0.4 |
| Comp. Ex. 34 | PP-9 | 65 | PEX-8 | 7 | EBM-8 | 7 | Elasto-mer-16 | 1 | Talc-3 | 20 | HALS-1 | 0.2 | Metal Salt-1 | 0.4 |
| Comp. Ex. 35 | PP-9 | 65 | PEX-8 | 7 | EBM-8 | 7 | Elasto-mer-17 | 1 | Talc-3 | 20 | HALS-1 | 0.2 | Metal Salt-1 | 0.4 |
| Comp. Ex. 36 | PP-9 | 65 | PEX-8 | 7 | EBM-7 | 7 | Elasto-mer-12 | 1 | Talc-4 | 20 | HALS-1 | 0.2 | Metal Salt-1 | 0.4 |

TABLE 22

|  | MFR g/10 min. | Flexural Modulus kg/cm$^2$ | IZOD Impact Strength kg · cm/cm | Elongation in Tension % | Surface Hardness | HDT ° C. | Adhesion to Paint Film | Prevention of Mold Contamination | Weathering Resistance |
|---|---|---|---|---|---|---|---|---|---|
| Ex. 17 | 31.5 | 26,100 | 23 | 500 or more | 83 | 132 | ○ | ○ | ○ |
| Ex. 18 | 30.7 | 27,400 | 18 | 500 or more | 84 | 134 | ○ | ○ | ○ |
| Ex. 19 | 37.3 | 26,400 | 17 | 500 or more | 82 | 131 | ○ | ○ | ○ |
| Ex. 20 | 33.0 | 26,200 | 21 | 500 or more | 81 | 130 | ○ | ○ | ○ |
| Ex. 21 | 30.6 | 25,500 | 22 | 500 or more | 84 | 132 | ○ | ○ | ○ |
| Ex. 22 | 32.8 | 26,700 | 22 | 500 or more | 84 | 132 | ○ | ○ | ○ |
| Ex. 23 | 29.1 | 26,000 | 25 | 500 or more | 83 | 130 | ○ | ○ | ○ |
| Ex. 24 | 31.0 | 26,200 | 22 | 500 or more | 84 | 132 | ○ | ○ | ○ |

TABLE 23

|  | MFR g/10 min. | Flexural Modulus kg/cm$^2$ | IZOD Impact Strength kg · cm/cm | Elongation in Tension % | Surface Hardness | HDT ° C. | Adhesion to Paint Film | Prevention of Mold Contamination | Weathering Resistance |
|---|---|---|---|---|---|---|---|---|---|
| Comp. Ex. 22 | 41.2 | 31,300 | 7 | 40 | 95 | 140 | x | ○ | ○ |
| Comp. Ex. 23 | 18.0 | 18,800 | 50 or more | 500 or more | 61 | 117 | ○ | ○ | ○ |
| Comp. Ex. 24 | 32.7 | 26,000 | 12 | 500 or more | 83 | 131 | Δ | ○ | ○ |
| Comp. Ex. 25 | 31.0 | 25,900 | 23 | 500 or more | 83 | 131 | ○ | ○ | x |
| Comp. Ex. 26 | 29.9 | 26,400 | 21 | 500 or more | 84 | 132 | ○ | x | ○ |
| Comp. Ex. 27 | 34.1 | 26,000 | 24 | 500 or more | 81 | 130 | ○ | x | ○ |
| Comp. Ex. 28 | 30.0 | 25,800 | 22 | 500 or more | 83 | 130 | ○ | x | ○ |
| Comp. Ex. 29 | 6.2 | 24,900 | 50 or more | 500 or more | 80 | 129 | ○ | ○ | ○ |
| Comp. Ex. 30 | 63.3 | 27,000 | 8 | 10 | 84 | 133 | ○ | ○ | ○ |
| Comp. Ex. 31 | 33.4 | 25,400 | 26 | 500 or more | 82 | 133 | x | ○ | ○ |
| Comp. Ex. 32 | 37.3 | 24,400 | 17 | 500 or more | 72 | 131 | Δ | ○ | ○ |
| Comp. Ex. 33 | 32.1 | 26,200 | 20 | 500 or more | 81 | 130 | x | ○ | ○ |
| Comp. Ex. 34 | 32.6 | 26,400 | 12 | 500 or more | 84 | 132 | ○ | ○ | ○ |
| Comp. Ex. 35 | 28.8 | 25,700 | 13 | 500 or more | 77 | 132 | ○ | ○ | ○ |
| Comp. Ex. 36 | 30.1 | 19,500 | 12 | 190 | 78 | 128 | ○ | ○ | ○ |

What is claimed is:

1. A thermoplastic resin composition comprising the following components (A) to (E):
    component (A): 50 to 74.7% by weight of a Ziegler-Natta catalyst sequentially polymerized blend of a propylene homopolymer and an ethylene-propylene copolymer containing a propylene homopolymer having a melt flow rate of 20 to 200 g/10 min. and an isotactic pentad fraction of at least 0.98, said blend having a melt flow rate of 10 to 100 g/10 min. and a ratio of the weight average molecular weight to the number average molecular weight of 5 to 7,
    component (B): 5 to 10% by weight of an ethylene-octene random copolymer having a melting temperature of 40 to 55° C. and a melt flow rate of 0.5 to 15 g/10 min.,
    component (C): 5 to 10% by weight of an ethylene-butene random copolymer having a melting temperature of less than 35° C. and having a melt flow rate of 0.5 to 15 g/10 min.,
    component (D): 0.3 to 5% by weight of an elastomer, the elastomer being either one comprising a block structure represented by the following formula (I) and/or the following formula (II) and having a melting temperature of 80 to 110° C., a melt flow rate of 0.5 to 20 g/10 min., a polyethylene crystalline moiety content of 20 to 40% by weight, and a random copolymer moiety content of 60 to 80% by weight, or one comprising a block structure represented by the following formula (III), the following formula (IV) and/or the following formula (V) and having a melt flow rate of not more than 15 g/10 min. and a polystyrene moiety content of 10 to 40% by weight and a random copolymer moiety content of 60 to 90% by weight:

polyethylene-(ethylene/butene random copolymer)-polyethylene (I)

polyethylene-(ethylene/butene random copolymer) (II)

polystyrene-(ethylene/butene random copolymer)-polystyrene (III)

polystyrene-(ethylene/propylene random copolymer)-
polystyrene    (IV)

polystyrene-(ethylene/propylene random copolymer)    (IV);

and component (E): 15 to 25% by weight of a talc having an average particle diameter of up to 5 μm and a specific surface area of at least 3.5 m²/g.

2. The thermoplastic resin composition according to claim 1, which further comprises the following components (F) and (G):

component (F): 0.05 to 2 parts by weight, based on 100 parts by weight in total of the components (A) to (E), of a hindered amine containing a group represented by the following formula:

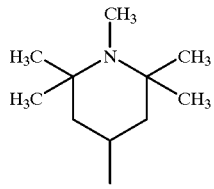

component (G): 0.05 to 4 parts by weight, based on 100 parts by weight in total of the components (A) to (E), of a metal salt represented by the following general formula [VI]:

(RCOO)₂X    [VI]

wherein R represents a monovalent hydrocarbon group having a molecular weight of 290 to 500 and X is zinc, magnesium, or calcium.

3. The thermoplastic resin composition according to claim 1 or 2, wherein the elastomer as the component (D) is a hydrogenation product of a butadiene polymer and the 1,2-conversion of butadiene in the ethylene-butene random copolymer is 60 to 90% by weight.

4. The thermoplastic resin composition according to claim 1 or 2, wherein said composition has a melt flow rate of at least 20 g/10 min., a flexural modulus of at least 20,000 kg/cm², an Izod impact value of at least 15 kg·cm/cm, an elongation in tension of at least 400%, a heat deformation temperature of at least 120° C., and a Rockwell hardness of at least 75.

* * * * *